Dec. 4, 1962 L. C. RUBENS ET AL 3,067,147
PROCESS OF FOAMING AND EXTRUDING POLYETHYLENE USING
1,2-DICHLOROTETRAFLUOROETHANE AS THE FOAMING AGENT
Filed Aug. 28, 1957
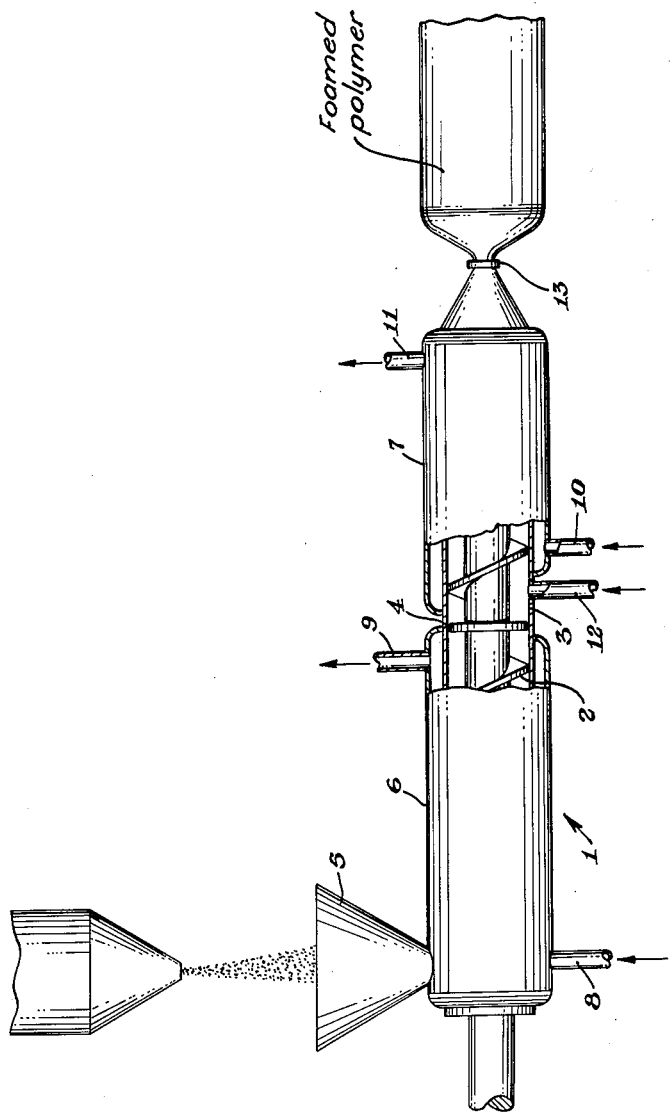
INVENTORS.
Louis C. Rubens
John Dennis Griffin
Demetrius Urchick
BY Griswold & Burdick
ATTORNEYS United States Patent Office 3,067,147
Patented Dec. 4, 1962

3,067,147
PROCESS OF FOAMING AND EXTRUDING POLY-
ETHYLENE USING 1,2-DICHLOROTETRAFLUO-
ROETHANE AS THE FOAMING AGENT
Louis C. Rubens, John Dennis Griffin, and Demetrius
Urchick, Midland, Mich., assignors to The Dow Chemi-
cal Company, Midland, Mich., a corporation of Dela-
ware
Filed Aug. 28, 1957, Ser. No. 680,654
3 Claims. (Cl. 260—2.5)

This invention concerns a process for making cellular aliphatic olefin polymer bodies. It relates more particularly to a method and certain volatile organic compounds as foaming agents for making cellular aliphatic olefin polymer bodies composed for the most part of substantially uniform fine cells.

In preparing cellular masses from thermoplastic resins it is common practice to incorporate in the material to be "foamed" a solid blowing agent which, under the influence of heat, evolves gas, thus causing the formation of numerous cells which impart low density to the finished product. It is known to incorporate a gas or volatile organic liquid with a thermoplastic resin and heat the latter to a temperature at which it becomes plastic whereby vapors of the gas or volatile liquid expand the softened resin to form a cellular mass.

U.S. Patent 2,387,730 makes cellular polyethlene by impregnating the molten polymer with a gas which is soluble therein under pressure, then partially releasing the pressure while maintaining the temperature to expand the polyethylene and cooling the expanded polymer.

The heretofore known methods for making cellular bodies from normally solid aliphatic olefin polymers, e.g. polyethylene, have not been entirely satisfactory since it is disadvantageous to partially release the pressure while maintaining the temperature sufficient to keep the polymer in a molten condition to expand the polymer, and the heretofore known methods are difficult to control to produce cellular masses composed of uniform small cells.

It is a primary object of the invention to provide an improved process and volatile agents for making cellular masses from thermoplastic normally solid aliphatic olefin polymers. Another object is to provide a process for making cellular masses from thermoplastic normally solid aliphatic olefin polymers in continuous manner. A further object is to provide a process and volatile agents for making cellular masses composed of uniform fine cells from thermoplastic normally solid aliphatic olefin polymers. A specific object is to provide a process and volatile foaming agents for making cellular polyethylene composed of uniform fine cells. Other and related objects may appear from the following description of the invention.

According to the invention the foregoing and related objects are obtained by forming a homogeneous flowable composition of a heat-plastified or molten normally solid thermoplastic polymer of one or more aliphatic olefins and a volatile organic compound which is a halogenated fluorine-containing hydrocarbon more specifically, 1,2-dichlorotetrafluoroethane, under pressure and extruding said composition into a zone of sufficiently lower pressure to cause expansion of the extruded material with resultant formation of a cellular polymer body.

The invention is described more particularly with reference to the accompanying drawing partly in section showing a diagrammatic sketch of an arrangement of apparatus suitable for practice of the invention.

In the drawing the numeral 1 indicates a plastics extruder having a forwarding screw 2 rotatably mounted in barrel 3 and fitted with a sealing disc 4. The barrel of the extruder is fitted with a feed hopper 5 and jackets 6 and 7 having inlets or outlets 8, 9, 10 and 11 for feed of a heat transfer medium such as steam, water, air, gas or oil therethrough. The barrel has an inlet 12 for feed of the 1,2-dichlorotetrafluoroethane into admixture with the heat-plastified polyolefin polymer and a discharge orifice 13. The screw of the extruder can be driven by any suitable means, e.g. an electric motor, not shown.

In practice of the process for making a cellular aliphatic polyolefin body, the polymer suitably in granular form is fed to the extruder through hopper 5 and is pressed by screw 2 and heated in the barrel 3 wherein it is melted or heat-plastified. The molten polymer is forwarded around sealing disc 4 thereby forming a plastic seal against countercurrent flow of gas or vapours through the barrel of the extruder. The foaming agent, i.e. 1,2-dichlorotetrafluoroethane is fed under pressure via inlet 12 into admixture with the molten polymer in the extruder wherein it is mechanically agitated, thoroughly mixed and is brought to a uniform temperature throughout its mass just prior to extrusion of the gel through orifice 13 into a zone of lower pressure, e.g. the atmosphere, wherein the gel expands to form a cellular body.

The 1,2-dichlorotetrafluoroethane has been found to be a particularly effective foaming agent for making cellular bodies from normally solid aliphatic olefin polymers, which cellular bodies are composed of uniform small cells.

The foaming agent can be employed in amount corresponding to from 0.05 to 0.5, preferably from 0.05 to 0.15, gram mole of the 1,2-dichlorotetrafluoroethane per 100 grams of the aliphatic olefin polymer.

The aliphatic olefin polymers to be employed in making the cellular products by the process of the invention can be normally solid polymers obtained by polymerizing aliphatic monoolefins such as ethylene, propylene, butene-1, pentene-1, 3-methylbutene-1, 4-methyl-pentene-1, 4-methylhexene-1 or 5-methylhexene-1, alone with one another, or with various other polymerizable compounds, but the polymers of ethylene or propylene alone are preferred because they produce tough resilient and fine celled chemically inert products. Examples of suitable polymerizable organic compounds which can be polymerized with ethylene or propylene are vinyl acetate, styrene, methyl methacrylate, tetrafluoroethylene or acrylonitrile. Copolymers containing in chemically combined form a predominant amount, e.g. 90 percent by weight or more, of ethylene or propylene with not more than 10 percent of one or more of such other polymerizable compounds can be used. The aliphatic olefin polymers can be modified by blending with polymeric materials, e.g. acrylonitrile-butadiene rubbers, poly(2-chloro-butadiene-1,3), polyisoprene or ethylene-vinylacetate copolymers. Halogenated aliphatic olefin polymers can also be used.

In practice the cellular aliphatic olefin polymer bodies are prepared by placing the molten polymer under pressure of the 1,2-dichlorotetrafluoroethane blowing agent such as by heating the materials in admixture with one another in a pressure resistant vessel at temperatures between about 90° and 200° C., suitably at a temperature at least as high as the melting point of the polymer, until a uniform or substantially uniform flowable gel is obtained. Thereafter, the gel is extruded into a zone of sufficiently lower pressure to cause the extruded material to expand with resultant formation of a cellular polymer body. The process can be carried out batchwise or in continuous manner.

The gel is preferably extruded at a temperature near or above the melting point of the olefin polymer, but higher or lower temperatures can be used. The temperature at which the gel is extruded into a zone of lower pressure will vary depending in part upon the size and arrangement of the apparatus employed, the rate of extrusion of the gel, the melting point of the olefin polymer and the proportions of the polymer and the 1,2-dichlorotetrafluoroethane employed.

In general, the gel can be extruded at a temperature of from about 25° C. below the temperature at which crystallization of the olefin polymer causes an observable cloudiness of the gel to a temperature of 25° C. or higher above the melting point of the polymer. The temperature at which crystallization of the olefin polymer causes a cloudiness of the gel can readily be determined by sealing weighed amounts of the polymer, e.g. polyethylene, and the 1,2-dichlorotetrafluoroethylene in a glass tube, heating the mixture to a temperature above the melting point of the polymer to obtain a transparent uniform gel, then cooling or allowing the gel to cool and observing the temperature at which the gel becomes hazy or cloudy. The temperature at which an observable cloudiness of the gel occurs is herein referred to as the "cloud point."

In a preferred practice for making a cellular aliphatic olefin polymer body in a continuous manner, the normally solid polymer, e.g. polyethylene, suitably in granular form, is fed to a plastics extruder wherein it is heat-plastified and blended with the volatile 1,2-dichlorotetrafluoroethane blowing agent under pressure in the desired proportion to form a homogeneous flowable composition, which composition is brought to a substantially uniform temperature between about 90° and 200° C. throughout its mass and is thereafter extruded or discharged through a suitable orifice into a zone of lower pressure, e.g. the atmosphere, wherein the extruded material expands to form a cellular body which cellular body is cooled and cut into pieces suitable for convenient handling.

The flowable gel of the aliphatic olefin polymer and the 1,2-dichlorotetrafluoroethane blowing agent under pressure is preferably extruded at a temperature approximately the same as, e.g. within 25° C. higher or lower than, the cloud point of the gel, into a zone of lower pressure.

The invention provides an improved and economical method for making cellular masses from aliphatic olefin polymers which cellular material is useful for a variety of purposes, e.g. as insulation or fillers for life rafts or jackets. The products possess a highly uniform fine cell structure consisting for the most part of thin-walled individually-closed cells, and are flexible, resilient, tough chemically inert materials.

Finely divided solid materials such as calcium silicate, zinc stearate, magnesium stearate and the like can advantageously be incorporated with the polymer or gel prior to expanding the same. Such finely divided materials aid in controlling the size of the cells, and are employed in amounts of from 0.1 to 2 percent by weight of the polymer.

The following examples illustrate ways in which the principle of the invention has been applied but are not to be construed as limiting its scope.

EXAMPLE 1

In each of a series of experiments, a charge of 80 grams of granular high pressure polyethylene (mol. wt. 25,000) and 0.459 gram mole of a volatile organic compound as identified in the following table as foaming agent was sealed in a steel tube about 18 inches long having an internal diameter of ⅞ inch. The tube was fitted with a frangible nickel disc having a bursting strength of about 725 p.s.i. The polyethylene and the foaming agent were heated under pressure in the steel tube at a temperature of 120° C. for a period of 2 hours. Thereafter, nitrogen gas was fed to the tube and sufficient pressure exerted to rupture the frangible nickel disc. The hot mixture of polyethylene and volatile materials was thereby explosively extruded into the atmosphere wherein it expanded to form a cellular mass. The table identifies the experiments and gives the approximate dimensions of the cellular mass as originally made and after storage in air at room temperature for a period of three months, together with a density value for the foam and its cell structure. For purpose of comparison, foams were prepared from other portions of the polyethylene employing foaming agents outside the scope of the invention.

Table

| | Starting Materials | | | Product | | | |
|---|---|---|---|---|---|---|---|
| Run No. | Polyethylene, gms. | Foaming Agent | | Foamed Mass Dimensions, Inches | Density, lbs./cu. ft. | | Remarks |
| | | Kind | Mole | | Original | After 3 mo. | |
| 1 | 80 | 1,2-Dichlorotetrafluoroethane | 0.459 | 6 × 24 | 2.06 | 1.94 | Uniform fine cells. |
| 2 | 80 | Isopentaene | 0.459 | 3 × 12 | 4.12 | 2.02 | Non-uniform large cells. |
| 3 | 80 | n-butane | 0.459 | 5 × 21 | 2.46 | 1.80 | Do. |
| 4 | 80 | Methyl Chloride | 0.459 | 3½ × 14½ | 3.23 | 2.32 | Do. |

EXAMPLE 2

A steel ampoule similar to that described in Example 1 was fitted with a tapered head having a 1/16-inch diameter drill hole as an orifice below the frangible disc. The ampoule was charged with 70 grams of granular low pressure polyethylene (prepared with Ziegler type catalyst) having a molecular weight of 300,000, and 26 grams of sym-dichlorotetrafluoroethane. The materials were heated in the steel ampoule under a pressure of 375 p.s.i. at a temperature of 175° C. for a period of 16 hours. Thereafter, a nitrogen gas was fed to the ampoule and sufficient pressure exerted to rupture the frangible disc. The polyethylene gel was thereby extruded through the 1/16-inch diameter orifice into the atmosphere wherein it foamed to form an elongated cellular body having a diameter of approximately ½ inch. The product was a tough resilient uniform fine celled mass.

EXAMPLE 3

A charge of 25 grams of polypropylene having a molecular weight of 316,000 and 30 grams of sym-dichlorotetrafluoroethane as foaming agent was sealed in a steel tube equipped with a frangible nickel disc as described in Example 1. The polypropylene and the foaming agent were heated in the steel ampoule under pressure of the materials at a temperature of 175° C. for 8 hours. Thereafter, nitrogen was fed to the tube and sufficient pressure exerted to burst the nickel disc, thereby explosively extruding the materials into the atmosphere wherein the polypropylene was expanded to a cellular mass. The product was a cellular body having a volume 27 times as great as the initial volume of the dense non-porous polypropylene and was composed of fine uniform cells. The product was soft and resilient.

EXAMPLE 4

Polyethylene having a melt index of 2, together with 1.5 percent by weight of zinc stearate, was fed in the form of solid granules into a plastics extruder at a rate corresponding to 30 pounds of the mixture per hour. The plastics extruder employed in the experiment comprised a four foot long barrel having a 2½-inch diameter screw equipped with a mixing head similar in design to that described in U.S. Patent No. 2,453,088, and a sealing plate positioned midway of the screw. An inlet to the barrel of the extruder was provided adjacent to the sealing plate for feed of a volatile organic compound as blowing agent into the barrel and into contact with the heat-plastified polyethylene. The sealing plate formed a constricted passageway between the rim of the plate and the bore of the barrel so that flow of the heat-plastified polyethylene through the constricted passageway by pressure of the flights of the screw formed an effective plastic seal against counter-current flow or leakage of the volatile organic compound from the extruder. The heat-plastified polyethylene was forwarded under pressure of the screw around the sealing plate and into the second section of the barrel of the extruder wherein it was mixed with 1,2-dichlorotetrafluoroethane fed thereto at a rate of 7.5 pounds per hour. The resulting mixture was blended under pressure, principally by action of the mixing head on the screw of the extruder, into a uniform composition and was brought to a temperature between 98° and 102° C. then forced through a discharge orifice of ⅛ x ½ inch cross-section into the atmosphere. The extruded material was allowed to expand freely in the air. The product was a cellular body of about 1 x 2 inches cross-section and was composed of substantially uniform fine cells having a diameter of approximately 0.7 mm. The product had a density of 1.7 pounds per cubic foot of the cellular mass.

We claim:
1. A process which comprises heating normally solid polyethylene at heat-plastifying temperatures between 90° and 200° C. in admixture with from 0.05 to 0.5 gram molecular proportion of 1,2-dichlorotetrafluoroethane per 100 grams of the polyethylene, under pressure to form a flowable gel and extruding said gel into a zone of lower pressure sufficient to expand the extruded gel with resultant formation of a cellular polyethylene body.

2. A process which comprises feeding heat-plastified polyethylene at temperatures between 90° and 200° C. together with from 0.1 to 2 percent by weight of a finely divided solid material and 1,2-dichlorotetrafluoroethane into admixture with one another under pressure in amounts corresponding to from 0.05 to 0.5 gram mole of the 1,2-dichlorotetrafluoroethane per 100 grams of the polyethylene to a mixing and cooling zone wherein the mixture is blended into a substantially uniform flowable composition and continuously extruding the composition under pressure at a substantially uniform temperature between 90° and 200° C. into a zone of sufficiently lower pressure to cause expansion of the extruded material with resultant formation of a cellular polyethylene body.

3. A process which comprises feeding heat-plastified polyethylene at temperatures between 90° and 200° C. together with from 0.1 to 2 percent by weight of zinc stearate and 1,2-dichlorotetrafluoroethane into admixture with one another under pressure in amounts corresponding to from 0.05 to 0.5 gram mole of the 1,2-dichlorotetrafluoroethane per 100 grams of the polyethylene to a mixing and cooling zone wherein the mixture is blended into a substantially uniform flowable composition and continuously extruding the composition under pressure at a substantially uniform temperature between 90° and 200° C. into a zone of sufficiently lower pressure to cause expansion of the extruded material with resultant formation of a cellular polyethylene body.

References Cited in the file of this patent

UNITED STATES PATENTS

| | | |
|---|---|---|
| 2,354,260 | Haney et al. | July 25, 1944 |
| 2,576,977 | Stober | Dec. 4, 1951 |
| 2,757,147 | Pooley | July 31, 1956 |
| 2,772,246 | Simon et al. | Nov. 27, 1956 |
| 2,774,991 | McCurdy et al. | Dec. 25, 1956 |
| 2,848,428 | Rubens | Aug. 19, 1958 |
| 2,848,739 | Henning | Aug. 26, 1958 |
| 2,885,738 | Henning | May 12, 1959 |

FOREIGN PATENTS

| | | |
|---|---|---|
| 626,151 | Great Britain | July 11, 1949 |
| 1,081,583 | France | June 9, 1954 |

OTHER REFERENCES

"Synthetic Resins and Allied Plastics," Various Authors, 1951, 3rd Edition, Oxford University Press, London, New York, Toronto, pages 200–207, 209–214.

Lange: "Handbook of Chemistry," 9th Edition, 1956, page 1196, Handbook Publishers, Inc., Sandusky, Ohio.

"The Journal of the Society of Cosmetic Chemists," vol. 7, No. 2, March 1956, "The Propellant in Aerosol Products," pages 147–149.